United States Patent [19]
Persson et al.

[11] 3,774,409
[45] Nov. 27, 1973

[54] DEEP-FREEZING APPARATUS

[75] Inventors: Per-Oskar Persson; Per Sture Astrom, both of Helsingborg; Lennart S. A. Emgard, Raa, all of Sweden

[73] Assignee: Frigoscandia Contracting AB, Helsingborg, Sweden

[22] Filed: Oct. 4, 1971

[21] Appl. No.: 185,945

[30] Foreign Application Priority Data
Oct. 8, 1970 Sweden............................ 13623/70

[52] U.S. Cl.................... 62/320, 62/346, 62/374, 99/192
[51] Int. Cl. ............................................. F25c 5/02
[58] Field of Search...................... 62/63, 345, 346, 62/374, 380, 320, 321, 341, 71, 72; 99/192

[56] References Cited
UNITED STATES PATENTS
2,968,568   1/1961   Preuss................................. 99/193
3,606,763   9/1971   Bevins.................................. 62/72
2,145,773   1/1939   Muffly................................. 62/345
3,253,420   5/1966   DeGeorge........................ 62/345 X Primary Examiner—Meyer Perlin
Assistant Examiner—Ronald C. Capossela
Attorney—Karl W. Flocks

[57] ABSTRACT

An apparatus for deep-freezing semi-fluid foodstuffs comprises a freezing device and two co-operating endless tracks which are coextensive over part of their length so as to form between them a fixed space for the foodstuff, the foodstuff in said space being frozen to a continuous cake. The apparatus also has means for detaching the continuous cake from the tracks and for breaking it into pieces.

6 Claims, 4 Drawing Figures

PATENTED NOV 27 1973 3,774,409
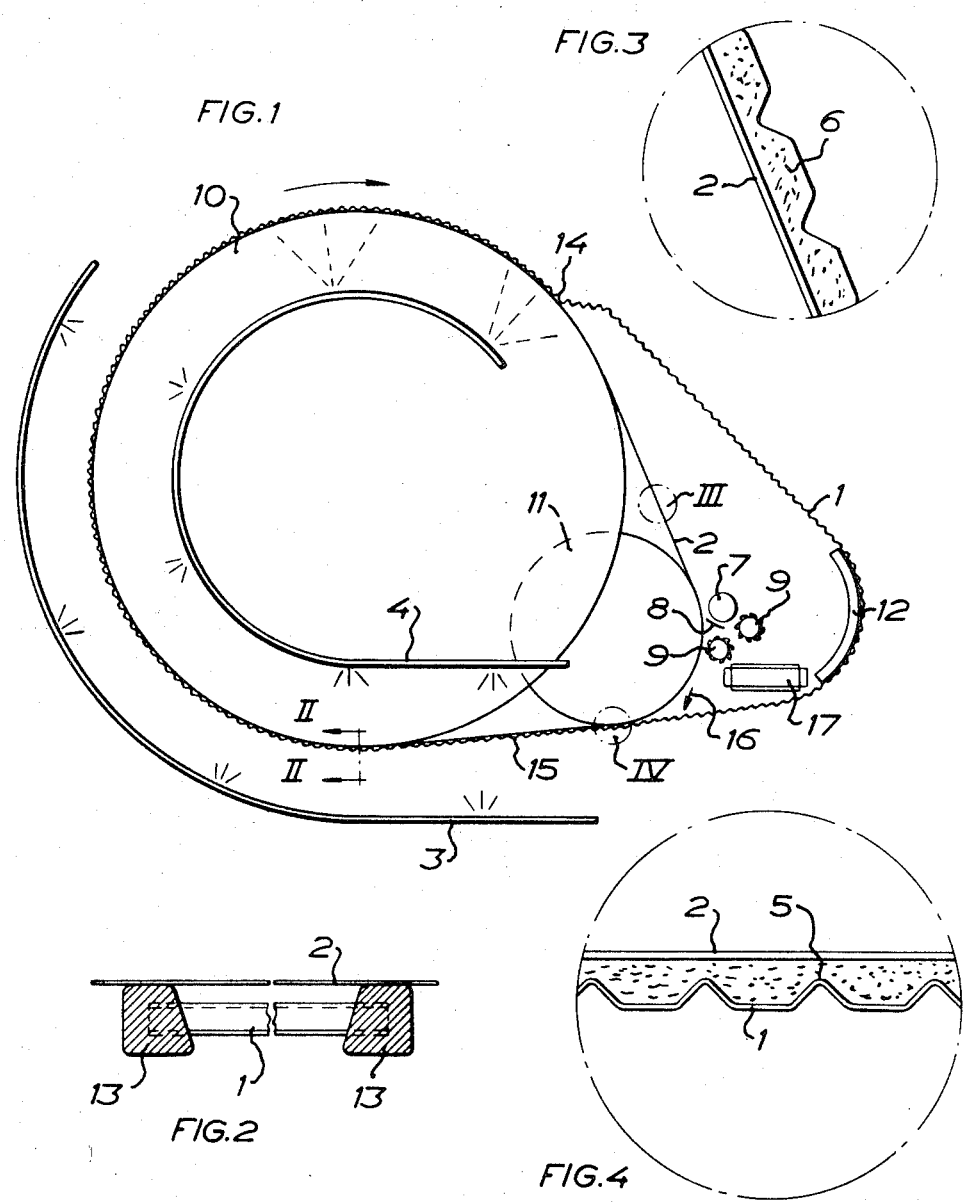

DEEP-FREEZING APPARATUS

The present invention relates to an apparatus for deep-freezing semi-fluid foodstuffs, such as chopped or stewed spinach, said apparatus comprising two co-operating endless tracks which are coextensive over part of their length so as to form between them a fixed space for the foodstuff, and which co-operate with a freezing device for deep-freezing the foodstuff in the space between the two tracks, one of the endless tracks being provided with transversely extending ridges directed towards the other track. Such apparatuses are intended for deep-freezing the semi-fluid foodstuff into small discrete particles which shall be freely movable relative to each other when brought together in a package or the like. This will make it possible to take out of a package precisely the quantity of the frozen foodstuff that is desired on one occasion.

In known apparatuses of this kind the tracks bear against one another so as to form between them small separate spaces for the foodstuff, the foodstuff in said spaces being frozen into said small discrete particles. In practice, it has proved very difficult to have the small discrete particles come loose from the tracks. This disadvantage is removed by the apparatus according to the present invention, which is characterized in that the tracks within that portion of their length on which they shall be coextensive to form between them a fixed space for the foodstuff, are spaced apart a greater distance than the height of the ridges so that the foodstuff in the space between the two tracks is frozen to a continuous cake; that after that portion of their length within which the continuous cake is frozen, the two tracks are deflected from the feeding direction of the cake in order to detach the cake from the tracks; and that the apparatus is provided with means for breaking the cake detached from the tracks at least along the transverse grooves formed in the cake by the ridges of one of the tracks. Thus, it is much easier to have the continuous deep-frozen foodstuff cake come loose from the tracks, since the cake strives to keep its shape and consequently its feeding direction.

The invention will be described in more detail with reference to the accompanying drawing which illustrates an embodiment, chosen by way of example, of the apparatus according to the invention.

FIG. 1 is a diagrammatical side elevation of the apparatus,

FIG. 2 is a section on line II—II in FIG. 1;

FIGS. 3 and 4 are views of the encircled portions III and IV in FIG. 1 on a considerably larger scale.

The apparatus comprises two co-operating endless tracks 1 and 2 which are coextensive over part of their length so as to form betwen them a fixed space for the foodstuff. More particularly, the tracks 1 and 2 are conveyor belts consisting for example of stainless sheet metal.

The two endless tracks 1 and 2 co-operate with a freezing device 3 and 4 for deep-freezing the foodstuff in the space between the tracks. To obtain an efficient freezing the two tracks 1 and 2 and the freezing device 3 and 4 are located completely within a well-insulated freezing compartment (not shown).

On that side which faces the inner track 2 the outer track 1 is provided with transversely extending ridges 5 formed simply by corrugating the stainless conveyor belt 1.

According to the invention the tracks 1 and 2 within that portion of their length on which they are coextensive so as to form between them a fixed space for the foodstuff, are spaced apart a greater distance then the height of the ridges 5 so that the foodstuff in the space between the two tracks is frozen to a continuous cake 6. After said portion of their length the two tracks are deflected from the feeding direction of the cake 6 in order to detach said cake 6 from said tracks 1 and 2. The apparatus also has means 7 and 8 for breaking the cake 6 detached from said tracks 1 and 2 into bars along the transverse grooves formed in the cake by the ridges 5. The apparatus should also have means 9 for breaking the bars into short preferably regular pieces, so that the small discrete particles are continuously produced.

The inner track 2 could be provided with low longitudinal ridges for the formation of weakened lines so that the short foodstuff pieces will surely get a regular shape. The ridges of the track 2 must not be so high as to jeopardise the formation of the continuous foodstuff cake 6.

In the embodiment illustrated the inner endless track 2 is passed over two drums, viz. a big drum 10 and a small drum 11. The drums 10 and 11, at least one of which is driven, comprise several juxtaposed wheels with comparatively small surfaces of engagement with the track 2. The outer endless track 1 which is coextensive with the inner track 2 over but part of its length has no particular drive, but follows the inner track 2 mainly owing to the connection provided by the frozen foodstuff between the tracks 1 and 2. Those portions of the outer endless track 1 which deviate from the inner track 2 co-operate with guide ribs 12 or like elements.

In order that the tracks 1 and 2 shall be spaced apart a greater distance than the height of the ridges 5, the track 1 according to the illustrated embodiment is provided at its longitudinal edges with plastics strips 13 or similar means that serve as spacers between the tracks 1 and 2. The plastics strips 13 thus bear against the somewhat wider track 2. The tracks 1 and 2 can be spaced for instance 8 mm apart, the distance between the ridges 5 and the track 2 being in that case preferably 3 mm, which implies that the ridges 5 are 5 mm high. The ridges 5 are spaced about 20 mm apart.

As appears from the drawing, the outer track 1 provided with the ridges 5 is deflected from the feeding direction of the cake 6 before the inner track 2 is deflected from the feeding direction of said cake 6. More particularly, the outer track 1 is deflected from the inner track 2 before said track leaves the circumference of the drum 10. After leaving the circumference of the drum 10 the inner track 2 follows a straight path, whereupon it diverts to pass along the circumference of the smaller drum 11. At said diversion the cake 6 leaves the inner track 2, since the cake 6 continues in its longitudinal direction. The cake 6 thus leaves the two tracks 1 and 2 safely and without energy consumption. Therefore, but a small force is required for the operation of the drums 10 and 11.

The freezing device comprises spraying devices 3 and 4 which spray a coolant, for instance glycol, onto those sides of the thin stainless belts 1 and 2 which face away from each other. After spraying the coolant is collected and cooled again to permit being sprayed once more onto the tracks 1 and 2.

The spraying device 3 for the track 1 having the ridges 5 shall terminate before the point 14 where said track is deflected from the feeding direction of the cake 6, while the spraying device 4 for the track 2 shall extend at least up to said point 14. This will guarantee that the cake 6 at the point 14 does not follow the track 1 having the ridges 5.

As appears from the drawing, the two endless tracks 1 and 2 are coextensive along a horizontal or slightly downwardly inclined path 15 ahead of the big drum 10, and the foodstuff supplying device indicated by the arrow 16 is disposed ahead of said path 15, whereby sufficient time is gained to subject the foostuff to a partial freezing before it reaches the drum 10, thus preventing the foodstuff from flowing along said drum. The foodstuff supplying device 16 preferably is a transversely reciprocating nozzle which through a hose is supplied with foodstuffs from the premises outside the insulated freezing compartment. According to the drawing, the means for breaking the cake 6 detached from the track 2 into bars along the transverse grooves formed in the said cake by the ridges 5 are a roll 7 and a strip 8. The roll bends the detached cake 6 towards the drum 11, while the strip bends said cake 6 away from the drum 11, resulting in the cake 6 being automatically broken into bars. Said bars ar then knocked off into short pieces by means of two rolls 9 which are provided with projections. The projections are laterally offset on the two rolls 9, the projections of one roll 9 serving as supports for the bars, while the projections of the other roll 9 serve as knock-off means.

Arranged below the rolls 9 is a conveyor belt 17 which carries the finished frozen products consisting of short pieces to a space outside the insulated freezing compartment, where the pieces are brought together in packages in which they are freely movable relative to each other.

A freezing device for 500 kg of foodstuffs an hour shall have a belt width of about 1,000 mm, while the big drum 10 shall have a diameter of about 2,000 mm. If the freezing device is to manage 1,000 kg of foodstuffs an hour the belt width is about 1,500 mm, while the diameter of the drum is about 2,600 mm.

What we claim and desire to secure by letters Patent is:

1. An apparatus for deep-freezing semi-fluid foodstuffs comprising
    two cooperating endless tracks which are coextensive over part of their length so as to form between them a fixed space for the foodstuff,
    a freezing device through which said endless tracks pass for deep-freezing the foodstuff in the space between said two tracks,
    transversely extending ridges on one of said endless tracks directed towards the other of said tracks,
    means to space said tracks apart a greater distance than the height of said ridges within that portion of their length on which they shall be coextensive so that foodstuff in the space is frozen to a continuous cake,
    means to deflect said two tracks from the feeding direction of the cake in order to detach the frozen cake from said tracks after said tracks have passed said freezing device,
    and means for breaking the cake which is detached from said tracks at least along transverse grooves formed in the cake by said ridges.
2. The apparatus of claim 1 further characterized by means for breaking the cake into short regular pieces located in the path of the frozen cake.
3. The apparatus of claim 1, further characterized by said means to space said tracks apart being plastic strips along the longitudinal edges of at least one of said tracks.
4. The apparatus of claim 1, further characterized by said means to deflect said two tracks causing said track having said ridges to deviate from the feeding direction of the cake before said other track is caused to deviate from the feeding direction of the cake.
5. The apparatus of claim 1, further characterized by said freezing device including coolant spraying devices,
    said tracks being of stainless sheet-metal whose sides which face away from each other cooperate with said coolant spraying devices.
6. The apparatus of claim 5, further characterized by those of said coolant spraying devices cooperating with said track having said ridges terminating ahead of the point where said track is deflected from the feeding direction of the cake,
    those of said coolant spraying devices cooperating with said other track extending at least up to said point.

* * * * *